United States Patent [19]

Chou et al.

[11] Patent Number: 4,578,183
[45] Date of Patent: Mar. 25, 1986

[54] FEED MIXING TECHNIQUE FOR FLUIDIZED CATALYTIC CRACKING OF HYDROCARBON OIL

[75] Inventors: Tai-Sheng Chou; Chang-Kuei Lee, both of Sewell, N.J.

[73] Assignee: Mobil Oil Corporation, New York, N.Y.

[21] Appl. No.: 676,967

[22] Filed: Nov. 30, 1984

[51] Int. Cl.[4] ............................................. C10G 35/14
[52] U.S. Cl. .................... 208/113; 208/153; 208/157; 208/164; 422/143
[58] Field of Search ............... 208/113, 153, 164, 157; 422/145, 140, 143

[56] References Cited

U.S. PATENT DOCUMENTS

| | | | |
|---|---|---|---|
| 2,606,097 | 8/1952 | Goodson et al. | 208/153 |
| 2,885,272 | 5/1959 | Kimberlin, Jr. et al. | 422/140 |
| 3,152,065 | 10/1964 | Sharp et al. | 422/140 X |
| 3,523,703 | 8/1970 | Van Driesen et al. | 422/145 |
| 3,754,993 | 8/1973 | Oguchi et al. | 422/141 X |
| 3,826,739 | 7/1974 | Kubo et al. | 208/157 |
| 4,141,794 | 2/1979 | Choi | 208/11 R X |
| 4,230,668 | 10/1980 | Sheely et al. | 422/140 |
| 4,417,974 | 11/1983 | Haunschild | 208/113 X |
| 4,427,537 | 1/1984 | Dean et al. | 422/140 X |
| 4,523,987 | 6/1985 | Penick | 208/157 |

Primary Examiner—John Doll
Assistant Examiner—Glenn A. Caldarola
Attorney, Agent, or Firm—A. J. McKillop; M. G. Gilman; L. P. Hobbes

[57] ABSTRACT

An improved Fluid Catalytic Cracking (FCC) Process wherein vaporization of oil feed is optimized prior to catalytic cracking. A draft tube mixer placed in the lower reactor riser splits the hot regenerated catalyst flow into two streams resulting in improved riser mixing of catalyst and oil.

8 Claims, 2 Drawing Figures

FEED MIXING TECHNIQUE FOR FLUIDIZED CATALYTIC CRACKING OF HYDROCARBON OIL

This invention relates to fluidized catalytic cracking (FCC) units for converting heavy petroleum fractions to produce lighter fuel products. In particular it relates to a mixing device for combining a continuous hydrocarbon feed stream with hot fluidizable solid catalyst particles in a fast riser type FCC vessel.

Conversion of various petroleum fractions to more valuable products in catalytic reactors is well known in the refining industry where the use of FCC reactors is particularly advantageous for that purpose. The FCC reactor typically comprises a thermally balanced assembly of apparatus comprising the reactor vessel containing a mixture of regenerated catalyst and the feed and regenerator vessel wherein spent catalyst is regenerated. The feed is converted in the reactor vessel over the catalyst, and carbonaceous deposits simultaneously form on the catalyst, thereby deactivating it. The deactivated (spent) catalyst is removed from the reactor vessel and conducted to the regenerator vessel, wherein coke is burned off the catalyst with air, thereby regenerating the catalyst. The regenerated catalyst is then recycled to the reactor vessel. The reactor-regenerator assembly must be maintained in steady state heat balance, so that the heat generated by burning the coke provides sufficient thermal energy for catalytic cracking in the reactor vessel. The steady state heat balance is usually achieved and maintained in FCC reactors by controlling the rate of flow of the regenerated catalyst from the regenerator to the reactor by means of an adjustable slide valve in the regenerator-to-reactor conduit.

Typically, the product stream of the catalytic cracker is fractionated into a series of products, including gas, gasoline, light gas oil, and heavy cycle gas oil. A portion of the heavy cycle gas oil is usually mixed with the fresh feed and recycled into the reactor vessel. The bottom effluent of the fractionator is conventionally subjected to settling and the solid-rich portion of the settled product may be recycled to the reactor vessel in admixture with the heavy cycle gas oil and feed.

In a modern FCC reactor, the regenerated catalyst is introduced into the base of a riser reactor column in the reactor vessel. A primary purpose of the riser reactor is to crack the petroleum feed. The regenerated hot catalyst is admixed in the bottom of the riser reactor with a stream of fresh feed, recycled petroleum fractions and steam ranging from about 0.1 to 10 wt% of the hydrocarbon. The resulting mixture is forced upwardly through the riser reactor. During the upward passage of the catalyst and of the petroleum fractions, the petroleum is cracked, and coke is simultaneously deposited on the catalyst. The coked catalyst and the cracked petroleum components are passed upwardly out of the riser and through a solid-gas separation system, e.g., a series of cyclones, at the top of the reactor vessel. The cracked petroleum fraction is conducted to product separation, while the coked catalyst, after stream stripping, passes into the regenerator vessel and is regenerated therein, as discussed above. Most of the cracking reactions in such modern FCC units take place in the riser reactor. Accordingly, the remainder of the reactor vessel is used primarily to separate entrained catalyst particles from the petroleum fractions.

Further details of FCC processes can be found in: U.S. Pat. Nos. 3,152,065 (Sharp et al); 3,261,776 (Banman et al); 3,654,140 (Griffel et al); 3,812,029 (Snyder); 4,093,537 (Gross et al); 4,118,337 (Gross et al); 4,118,338 (Gross et al); 4,218,306 (Gross et al); 4,444,722 (Owen); 4,459,203 (Beech et al); as well as in Venuto et al, Fluid Catalytic Cracking With Zeolite Catalysts, Marcel Dekker, Inc. (1979). The entire contents of all of the above patents and publications are incorporated herein by reference.

Performance characteristics of FCC reactors can be measured by a number of factors, e.g., conversion of feed to all of the products of the FCC reactor, such as gasoline, light fuel oil, coke and gas; selectivity of the conversion of feed to gasoline and light fuel oil products; and octane number of product gasoline.

Conventional FCC catalyst may be used in the reactor; utilizing the process. Suitable catalysts are, for example, those containing silica, silica alumina or mixtures thereof. Particularly useful are acidic zeolites, preferably low coke-producing crystalline zeolite cracking catalysts comprising faujasite, and other zeolites known in the art. Typically, the catalyst is a fine particle having an average size of about 20 to 100 microns.

In FCC cracking, hot catalyst (640 to 730° C.) is mixed with relatively cold (105°–390° C.) charge stock. The catalyst is the heat transfer medium for vaporizing and superheating the oil to a temperature suitable for the desired cracking reaction (500°–560° C.). In the initial stage of mixing oil and catalyst, some oil is inevitably heated to a temperature approaching that of the hot catalyst with consequent overcracking, creating a large increase in gas make. Coking of the catalyst is particularly heavy when the hot catalyst contacts oil above desired cracking temperature.

The use of a draft tube in fluidized beds is known and has been used for studying induced solids circulation in such beds. See, e.g, Davidson, J. F., AIChE Symp. Ser. No. 128, Vol. 69, 16–17 (1973); LaNauze, R. D., Powder Technology, 15, 117–127, (1976); LaNauze, R. D. and J. F. Davidson, "Fluidization Technology" Vol. II, D. L. Keairns (editor), 113–124 (1976); and Yang, W. C. and D. L. Keairns, AIChE Symp. Ser., No. 141, Vol. 70, 27–40, (1974), all of which are incorporated herein by reference. The concept as applied in several fluid bed coal gasification processes was shown to achieve smooth and rapid circulation of the solid through the draft tube. See, e.g. Yank, W. C. and D. L. Keairns, "Fluidization Technology", Vol. II, 51–64 (1976); Horsler, A. G., J. A. Lacey and B. H. Thompson, Chem. Eng. Progra., 65 (10), 59 (1969); Dent, F J., "Methane From Coal", 9th Coal Science Lecture, BCURA (1960); all of which are incorporated herein by reference. U.S. Pat. Nos. 3,246,960 and 3,152,065 relate to an FCC riser utilizing a feed inlet through a multiple series of parallel pipes.

As discussed in the above cited literature, gas is normally fed to the base of a draft tube at a superficial gas velocity inside the tube which is greater than that in the annulus outside the tube. A difference in the bulk solid density is thus created, which induces the solid entrainment into the draft tube. The solid particles are picked up pneumatically and transported upward in the draft tube. The rate of entrainment depends on the superficial gas velocity, the open cross-sectional area for catalyst flow, and the fluidization characteristics of catalyst particles. It is known that increasing superficial gas velocity can increase the solid entrainment rate. However, this rate quickly approaches an asymptotic value as the gas velocity is further increased. This can partially explain why FCC units designed for a high catalyst circulation rate are limited by a maximum stable catalyst circulation rate (e.g. less than 300 lbs/ft$^2$ sec). The severe pressure fluctuation often encountered at the riser bottom may also be a direct consequence of this effect. That is, the catalyst lifting capability of the current nozzle design is ineffective when handling high catalyst circulation. The use of additional steam or nitrogen injection will improve flow somewhat but it may not be sufficient to completely alleviate the pressure fluctuation problems.

Accordingly, it would be desirable to alleviate the severe pressure fluctuation problem while retaining the potential benefits of good catalyst/oil mixing in the riser bottom. One method of reducing pressure fluctuation is disclosed in commonly assigned U.S. patent application Ser. No. 665,333, now U.s Pat. No. 4,523,987 filed on or about Oct. 26, 1984 which discloses an FCC unit utilizing a venturi tube mixer in order to mix catalyst and hydrocarbon feed. Such a unit minimizes localized overheating as well as reducing undesired pressure surges.

The controlled catalyst/oil mixing afforded by the present invention can be utilized to optimize a yield of more valuable hydrocarbons such as gasoline boiling range hydrocarbons while minimizing dry gas makes.

The improvement herein comprises a novel technique for continuously injecting oil feed into a primary mixing zone in a draft tube mixer. The mixer comprises a substantially tubular member extending lengthwise in the riser from a point below a regenerating catalyst return conduit to a point above the conduit and terminating in an upper outwardly flared discharge end. The discharge end substantially extends to the riser wall of the reactor. The draft tube mixer contains apertures in the portion of the mixer extending above the catalyst return conduit. The mixer can be spaced inwardly from the reactor riser wall with the lower portion of the mixer substantially adjacent a regenerated catalyst return conduit.

In a preferred embodiment an improved reactor is provided for fluidized bed catalytic cracking comprising a vertical riser operatively connected through a regenerated catalyst return conduit to a hot regenerated catalyst source; a means for feeding oil under pressure to said vertical riser; a mixing means for combining a first catalyst increment from the hot regenerated catalyst source with feed oil in a mixing chamber substantially coaxially aligned with the riser. The mixing chamber comprises a draft tube mixer comprising a substantially tubular member extending lengthwise in the riser from a point below the regenerated catalyst return conduit to a point above the conduit and terminating in an upper outwardly flared discharge end which substantially extends to the reactor riser wall. The interior of the draft tube mixer communicates with the outer periphery of the reactor riser through apertures located in the portion of said draft tube mixer extending above the catalyst return conduit. A second catalyst increment introduced through the conduit and passing upwardly through the reactor riser outside of the draft tube mixer can pass through the apertures to combine with substantially vaporized feed in admixture with the first catalyst increment. The heat content of the first increment suffices to effect feed vaporization without substantial cracking of the feed. The second increment provides additional heat for cracking at least some of the vaporized feed as it passes upwardly through the upper draft tube and the remaining portion of the riser.

These and other features and advantages of the invention will be seen in the following description and in the drawings.

In general, this invention can be utilized with conventional FCC reactor, such as those disclosed in the references set forth above. Similarly, the process of this invention can also be utilized with various cracking feeds, such as naphthas, gas oils, vacuum gas oils, residual oils, light and heavy distillates and synthetic fuels.

Figure 1:
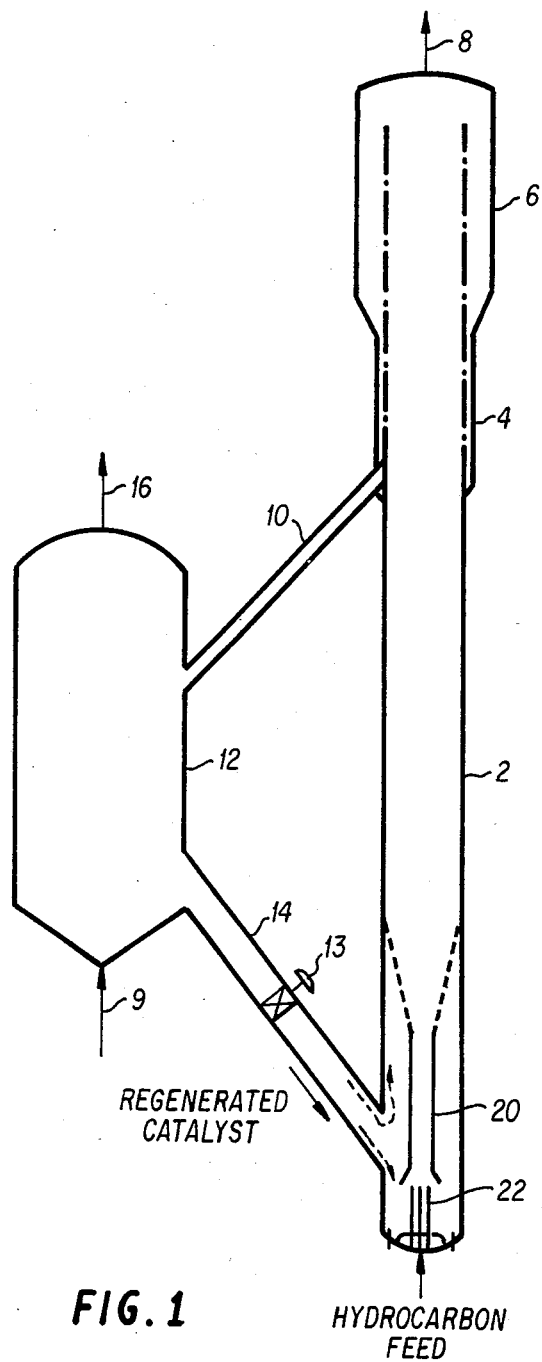
FIG. 1 is a schematic diagram of a vertical FCC reactor and regenerator system, including an improved mixing device.

In reference to FIG. 1, representing a schematic flow diagram of an exemplary FCC unit, a hydrocarbon feed mixed with steam ranging from 0.1 to 10 weight percent of the hydrocarbon is introduced at the bottom of the riser reactor 2. Hot regenerated catalyst is also introduced to the bottom of the riser by a regenerated catalyst return conduit 14, usually equipped with a flow control valve 13. The feed volatilizes, forms a suspension with the catalyst, and proceeds upwardly in the reactor. The suspension formed in the bottom section of the riser is passed upwardly through the riser under selected temperature and residence time conditions. The suspension passes into a generally wider section of the reactor 6 which contains solid-vapor separation means, such as a conventional cyclone, and means for stripping entrained hydrocarbons from the catalyst. Neither the stripping section, nor the solid-gas separation equipment is shown in the drawing for clarity. Such equipment is that conventionally used in catalytic cracking operations of this kind and its construction and operation, it is believed, will be apparent to those skilled in the art. The vapor separated in the cyclone and in the stripping means, including the diluent vapor, is withdrawn from the reactor by a conduit 8.

Stripped catalyst containing carbonaceous deposits (or coke) is withdrawn from the bottom of the stripping section through a conduit 10 and conducted to a regeneration vessel 12. In the regeneration zone the catalyst is regenerated by passing an oxygen-containing gas, such as air, through a conduit 9, burning the coke off the catalyst in a regenerator 12. Flue gas leaves the regenerator by a conduit 16.

Figure 2:
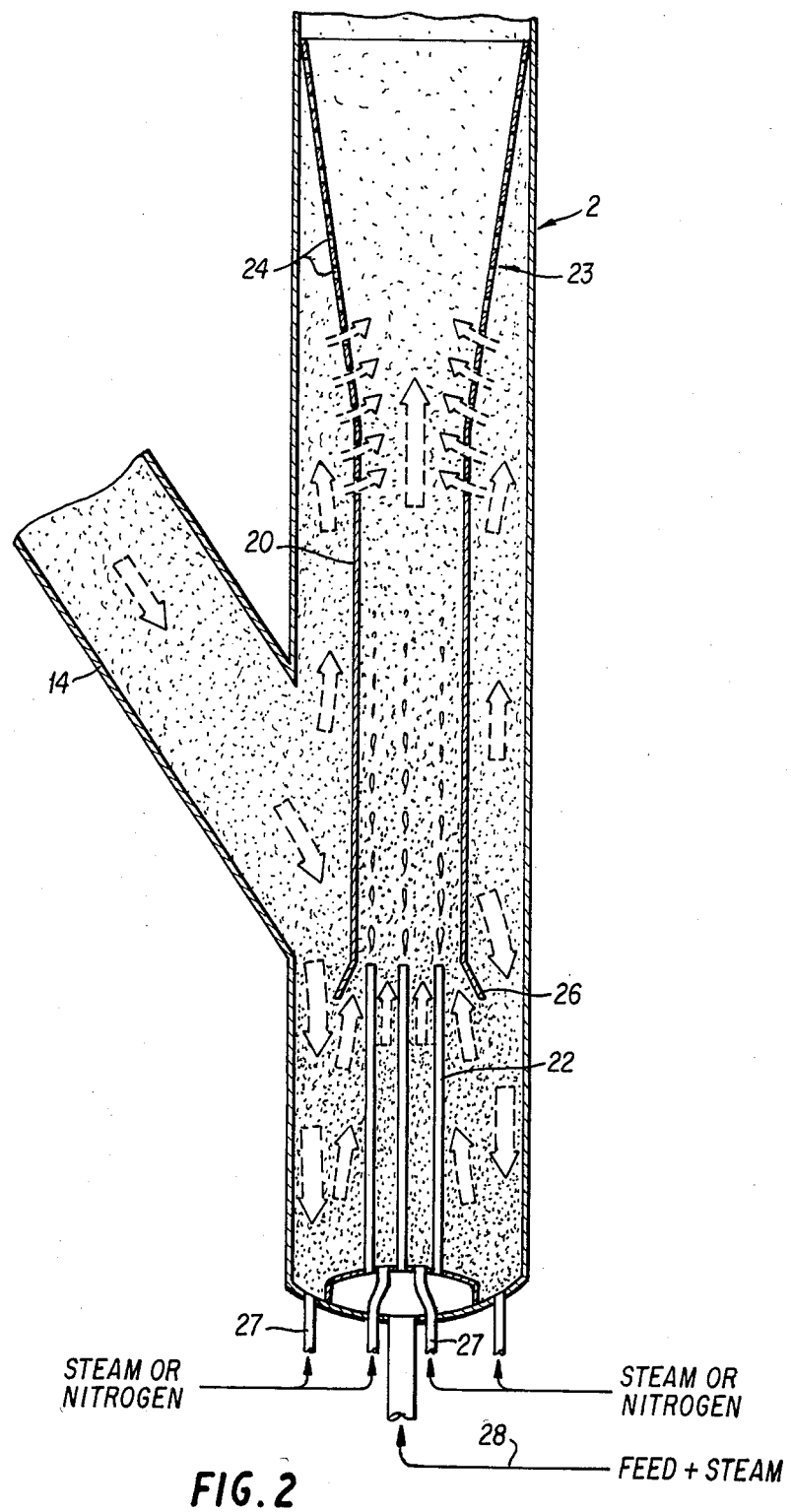
FIG. 2 depicts a detailed representation of the reactor riser and mixing device.

The reactor riser usually comprises an elongated cylindrical smooth-walled tube. The mixing device 20 which is shown in detail in FIG. 2 comprises an axially aligned draft tube 20 having one or more feed inlet nozzles 22. The draft tube has an upper outwardly flared discharge end 23. The portion of the draft tube extending above the junction of regenerated catalyst inlet 14 and riser 2 contains apertures 24 which permit passage of a second catalyst increment passing outside of the draft tube therethrough in order to combine with a first catalyst increment within the draft tube. The flow of both catalyst increments is marked by arrows.

The oil charge stock (preheated or not) mixed with steam is used as the propulsion medium in the draft tube mixer 20, which achieves mixing of the oil feed with a controlled quantity of hot catalyst. The hot regenerated catalyst passes through the lower end of the draft tube mixer 26 where it contacts the liquid oil feedstock, inducing vaporization due to the vigorous mixing of the hydrocarbon feed and the hot regenerated catalyst, while minimizing cracking in the draft tube 20. The mixing and vaporization occurs substantially within the draft tube mixer 20 into which the nozzles 22 discharge.

As the preheated mixture in the draft tube mixer rises above the level of the regenerated catalyst return conduit 14, it is mixed with additional hot catalyst which flows upwardly through the riser along the outside of the draft tube mixer and passes through the apertures 24 into the upper end of the draft tube mixer.

In a typical FCC installation where an overall catalyst to oil ratio of about 5 exists, advantageously, the incremental streams can be proportioned so that about 2 parts of catalyst could pass through the lower end of premix the draft tube mixer and 1 part through the outside of the draft tube mixer and through the apertures.

The fluidic action of the feed through the inlet nozzles 22 tends to keep a uniform flow of catalyst up through the lower end of the draft tube mixer and minimizes pressure surges associated with sudden mixing of slugs of hot catalyst with hydrocarbon feed. The apertures may be of any suitable shape which permits the desired mixing, e.g. slots. In order to improve catalyst lift, steam may be included with the feed passing through the inlet multi-nozzles 22. In addition, steam and/or nitrogen may be added through separate inlets 27 in the reactor riser bottom while hydrocarbon feed is introduced through a hydrocarbon inlet 28. The parts of the nozzles and draft tube mixer exposed to rapid catalyst movement should be hard surfaced to minimize wear. Suitable grades of steel may be employed as the main materials of construction. In the operation of FCC units according to this catalyst-feedstock mixing technique, the first catalyst increment flows in a continuous stream under steady state conditions from the regenerated catalyst supply conduit 14 through the fluidized induction path created by the flow of hydrocarbon feed through the draft tube. The second catalyst increment is induced upwardly along the outside of the lower portion of the draft tube mixer by the pressure differential resulting from the passage of feed and catalyst through the draft tube mixer. The relative ratio of catalyst flowing through the interior of the draft tube mixer to catalyst flowing outside the lower part of the draft tube venturi can vary depending upon catalyst temperature, feedstock volatility, etc. A typical FCC zeolite catalyst and heavy oil feedstock may operate with a relative weight ratio of about 3 to 10.

Mixer configuration and relative reactor riser dimensions may be determined from these material properties as well. Venturi design can be optimized by providing the outlet area as a fraction of total reactor riser cross sectional area. Advantageously, the ratio of total riser area to venturi outlet area ranges from about 1 to 3.

Other factors to be considered are the travel path of the first increment from the catalyst supply conduit outlet into the reactor riser and into the draft tube flow path. In order to avoid undesirable pressure drop, a long tortuous path for the first increment should be avoided or minimized. The draft tube mixer is preferably positioned coaxially in the riser within the direct flow path or projection aspect of the supply conduit. In a typical installation the draft tube mixer longitudinal dimension will be about 2 to 5 times that of the riser diameter, D.

The draft tube mixer structure may be supported in the riser by any suitable method, e.g., it may be attached to the riser side walls by radial struts or the like.

Advantageously, the feedstock comprises a petroleum oil fraction maintained at a temperature of about 105° C. to 390° C., the hot regenerated catalyst leaves the regenerator vessel at about 640° C. to 730° C., the mixture of vaporized feed and the first catalyst portion is vigorously mixed in the draft tube and is further heated by the second catalyst portion to an average process cracking temperature of about 500° C. to 560° C. The weight ratio of total catalyst to feed is usually about 3 to 10.

What is claimed is:

1. In a fluid catalytic cracking process comprising admixing a hydrocarbon oil feed with hot regenerated catalyst in the bottom section of a reactor riser, passing the mixture of the hydrocarbon oil feed and the catalyst through the riser, thereby at least partially volatilizing the oil feed and effecting cracking thereof at process temperature under endothermic process conditions and deactivating the catalyst by deposition of carbonaceous deposits thereon, separating the deactivated catalyst from the cracked hydrocarbonaceous feed, passing the deactivated catalyst to a regenerator vessel wherein the carbonaceous deposits are removed from the deactivated catalyst under oxidizing conditions by means of a regenerating medium introduced into the regenerator vessel, and passing the regenerated hot catalyst through a regenerated catalyst return conduit substantially above process cracking temperature to the bottom section of the reactor riser; the improvement comprising injecting oil feed into a primary mixing zone in a draft tube mixer, which comprises a substantially tubular member extending lengthwise in the riser reactor from a point below said regenerating catalyst return conduit to a point above said conduit and terminating in an upper outwardly flared discharge end substantially extending to said reactor riser wall, and said draft tube mixer containing apertures in the portion of said mixer extending above said catalyst return conduit;

continuously passing a first portion of the hot regenerated catalyst into the draft tube mixer sufficient to vaporize a major amount of oil feed without substantial cracking thereof; and passing a remaining second hot regenerated catalyst portion into the reactor riser through a passage between the draft tube mixer and reactor riser wall and thereafter through said apertures, thereby mixing additional hot catalyst with vaporized oil feed to crack the oil feed in the draft tube mixer and in the remaining portion of the riser.

2. The process of claim 1 wherein the feed comprises a petroleum oil fraction at a feed temperature of about 105° C. to 390° C., the hot regenerated catalyst is passed from the regenerator vessel at about 640° C. to 730° C., and the mixture of vaporized feed and the first catalyst portion contacts the second catalyst portion at a temperature below about 560° C.

3. The process of claim 1 wherein the weight ratio of total catalyst to feed is about 3 to 10, and wherein a major amount of total catalyst comprises the first portion.

4. The process of claim 1 wherein the draft tube mixer is coaxially mounted in a vertical tube reactor riser, and wherein the first catalyst portion is admixed with feed oil at a weight ratio of about 2 to 7 and wherein the combined catalyst stream is admixed at a feed weight ratio of about 3 to 10.

5. The process of claim 1 wherein said draft tube mixer comprises an outwardly flared bottom terminus.

6. The process of claim 1 wherein said oil feed is injected into said primary mixing zone through a plurality of nozzles.

7. An improved reactor for fluidized bed catalytic cracking comprising a vertical riser operatively connected through a regenerated catalyst return conduit to a hot regenerated catalyst source;

means for feeding oil under pressure to said vertical riser;

mixing means for combining a first catalyst increment from the hot regenerated catalyst source with feed oil in a mixing chamber coaxially aligned with said riser, and comprising a draft tube mixer comprising a substantially tubular member extending lengthwise in the riser from a point below said regenerated catalyst return conduit to a point above said conduit and terminating in an upper outwardly flared discharge end substantially extending to said reactor riser wall wherein the interior of said draft tube mixer communicates with the outer periphery of the reactor riser through apertures located in the portion of said draft tube mixer extending above said catalyst return conduit such that a second catalyst increment introduced through said conduit and passing upwardly through the reactor riser outside of the draft tube mixer can pass through said apertures to combine said second catalyst increment with substantially vaporized feed in admixture with the first catalyst increment, said first increment being sufficient to effect feed vaporization without substantial cracking thereof, and said second increment providing additional heat for cracking vaporized feed.

8. The reactor of claim 7 wherein said reactor riser comprises an elongated cylindrical smooth-walled tube, said mixing means comprises a coaxially aligned draft tube having an outwardly flared bottom terminus and a plurality of feed inlet nozzles disposed within the draft tube.

* * * * *